US010181322B2

(12) United States Patent
Hakkani-Tur et al.

(10) Patent No.: US 10,181,322 B2
(45) Date of Patent: Jan. 15, 2019

(54) MULTI-USER, MULTI-DOMAIN DIALOG SYSTEM

(71) Applicant: MICROSOFT TECHNOLOGY LICENSING, LLC, Redmond, WA (US)

(72) Inventors: Dilek Hakkani-Tur, Los Altos, CA (US); Gokhan Tur, Los Altos, CA (US); Larry Paul Heck, Los Altos, CA (US); Dong Wang, Pacifica, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 14/137,566

(22) Filed: Dec. 20, 2013

(65) Prior Publication Data

US 2015/0179168 A1 Jun. 25, 2015

(51) Int. Cl.
*G06F 17/00* (2006.01)
*G06F 17/27* (2006.01)
*G10L 21/00* (2013.01)
*G10L 15/22* (2006.01)

(52) U.S. Cl.
CPC ........ *G10L 15/22* (2013.01); *G10L 2015/228* (2013.01)

(58) Field of Classification Search
CPC ........... G06F 17/00; G06F 17/27; G10L 21/00
USPC ........................................... 704/9, 235, 275
See application file for complete search history.

(56) References Cited

U.S. PATENT DOCUMENTS

| 7,281,022 | B2 * | 10/2007 | Gruhl ............... G06F 17/30705 |
| 7,451,089 | B1 * | 11/2008 | Gupta .................... G06F 3/167 |
| | | | 704/270.1 |
| 7,853,451 | B1 | 12/2010 | Gupta et al. |
| 8,073,681 | B2 * | 12/2011 | Baldwin ................ G10L 15/22 |
| | | | 704/270 |
| 8,327,414 | B2 * | 12/2012 | Strassner ........... H04L 63/0263 |
| | | | 704/1 |

(Continued)

OTHER PUBLICATIONS

Tur et al. "The CALO meeting assistant system." Audio, Speech, and Language Processing, IEEE Transactions on 18.6 (2010): 1601-1611.*

(Continued)

*Primary Examiner* — Seong Ah A Shin

(57) ABSTRACT

A dialog system for use in a multi-user, multi-domain environment. The dialog system understands user requests when multiple users are interacting with each other as well as the dialog system. The dialog system uses multi-human conversational context to improve domain detection. Using interactions between multiple users allows the dialog system to better interpret machine directed conversational inputs in multi-user conversational systems. The dialog system employs topic segmentation to chunk conversations for determining context boundaries. Using general topic segmentation methods, as well as the specific domain detector trained with conversational inputs collected by a single user system, allows the dialog system to better determine the relevant context. The use of conversational context helps reduce the domain detection error rate, especially in certain domains, and allows for better interactions with users when the machine addressed turns are not recognized or are ambiguous.

20 Claims, 9 Drawing Sheets

(56) References Cited

U.S. PATENT DOCUMENTS

| | | | | |
|---|---|---|---|---|
| 9,002,701 | B2* | 4/2015 | Kandekar | G06F 17/2745 704/1 |
| 9,195,635 | B2* | 11/2015 | Liu | G06F 17/21 |
| 2005/0108036 | A1* | 5/2005 | Andreoli | G06Q 40/04 705/80 |
| 2007/0050191 | A1* | 3/2007 | Weider | G06F 17/30864 704/275 |
| 2007/0124263 | A1* | 5/2007 | Katariya | G06F 17/30663 706/14 |
| 2008/0306899 | A1* | 12/2008 | Gregory | G06F 17/30719 |
| 2009/0012787 | A1* | 1/2009 | Itoh | G10L 15/26 704/235 |
| 2010/0106486 | A1* | 4/2010 | Hua | G06K 9/6226 704/9 |
| 2010/0268536 | A1 | 10/2010 | Suendermann et al. | |
| 2011/0060591 | A1* | 3/2011 | Chanvez | H04M 3/2281 704/270 |
| 2012/0016678 | A1* | 1/2012 | Gruber | G06F 17/3087 704/275 |
| 2012/0078613 | A1* | 3/2012 | Kandekar | G06F 17/2745 704/9 |
| 2015/0179170 | A1* | 6/2015 | Sarikaya | G10L 15/22 704/275 |
| 2015/0317302 | A1* | 11/2015 | Liu | G06F 17/28 704/9 |

OTHER PUBLICATIONS

Hearst, "TextTiling: Segmenting text into multi-paragraph subtopic passages." Computational linguistics 23.1 (1997): 33-64.*

Hakkani-Tür et al. "A discriminative classification-based approach to information state updates for a multi-domain dialog system." (2012).*

Celikyilmaz et al., "A joint model for discovery of aspects in utterances." Proceedings of the 50th Annual Meeting of the Association for Computational Linguistics: Long Papers—vol. 1. Association for Computational Linguistics, 2012.*

Ang et al., "Automatic Dialog Act Segmentation and Classification in Multiparty Meetings." ICASSP (1). 2005.*

Hakkani-Tür et al. "Translating natural language utterances to search queries for slu domain detection using query click logs." Acoustics, Speech and Signal Processing (ICASSP), 2012 IEEE International Conference on. IEEE, 2012.*

Bonus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.

Kawahara, Tatsuya, "New Perspectives on Spoken Language Understanding: Does Machine Need to Fully Understand Speech?", In IEEE Workshop on Automatic Speech Recognition & Understanding, Nov. 13, 2009, 5 pages.

Galley, et al., "Discourse Segmentation of Multi-Party Conversation", In Proceedings of the 41st Annual Meeting of the Association for Computational Linguistics, Jul. 2003, 8 pages.

Carletta, Jean, "Unleashing the Killer Corpus: Experiences in Creating the Multi-Everything AMI Meeting Corpus", In Language Resources and Evaluation, Dec. 11, 2006, 12 pages.

Murray, et al., "Interpretation and Transformation for Abstracting Conversations", In Proceedings of Human Language Technologies, Annual Conference of the North American Chapter of the ACL, Jun. 2010, 9 pages.

Price, P. J., "Evaluation of Spoken Language Systems: The ATIS Domain", In Proceedings of the Workshop on Speech and Natural Language, Jun. 1990, 5 pages.

Lemon, et al., "DUDE: A Dialogue and Understanding Development Environment, Mapping Business Process Models to Information State Update Dialogue Systems", In Proceedings of the Eleventh Conference of the European Chapter of the Association for Computational Linguistics: Posters & Demonstrations, Apr. 2006, 4 pages.

Shriberg, et al., "Learning When to Listen: Detecting System-Addressed Speech in Human-Human-Computer Dialog", In Proceedings of Interspeech, Sep. 2012, 4 pages.

Hakkani-Tur, et al., "Exploiting Query Click Logs for Utterance Domain Detection in Spoken Language Understanding", In IEEE International Conference on Acoustics, Speech and Signal Processing, May 22, 2011, 4 pages.

Stolcke, et al., "Dialogue Act Modeling for Automatic Tagging and Recognition of Conversational Speech", In Journal of Computational Linguistics, vol. 26, Issue 3, Sep. 2000, 34 pages.

Ang, et al., "Automatic Dialog Act Segmentation and Classification in Multiparty Meetings", In IEEE International Conference on Acoustics, Speech, and Signal Processing, vol. 1, Mar. 18, 2005, 4 pages.

Hakkani-Tur, et al., "Mining Search Query Logs for Spoken Language Understanding", In Workshop on Future Directions and Needs in the Spoken Dialog Community: Tools and Data, Jun. 7, 2012, 4 pages.

Celikyilmaz, et al., "A Joint Model for Discovery of Aspects in Utterances", In Proceedings of the 50th Annual Meeting of the Association for Computational Linguistics: Long Papers, vol. 1, Jul. 2012, 9 pages.

Boyer, et al., "Dialogue Act Modeling in a Complex Task-Oriented Domain", In Proceedings of the 11th Annual Meeting of the Special Interest Group on Discourse and Dialogue, Sep. 2010, 9 pages.

Kirschner, et al., "Towards an Empirically Motivated Typology of Follow-Up Questions: The Role of Dialogue Context", In Proceedings of the 11th Annual Meeting of the Special Interest Group on Discourse and Dialogue, Sep. 24, 2010, 10 pages.

Hakkani-Tur, et al., "Bootstrapping Domain Detection Using Query Click Logs for New Domains", In Proceedings of INTERSPEECH, Aug. 28, 2011, 4 pages.

Hearst, Marti A., "TextTiling: Segmenting Text into Multi-paragraph Subtopic Passages", In Journal of Computational Linguistics, vol. 23, Issue 1, Mar. 1997, 32 pages.

Wang, et al., "Understanding Computer-Directed Utterances in Multi-User Dialog Systems", In IEEE International Conference on Acoustics, Speech, and Signal Processing, May 2013, 5 pages.

Favre, et al., "Icsiboost", Published on: Jun. 9, 2007, Available at: https://code.google.com/p/icsiboost/.

* cited by examiner

MULTI-USER, MULTI-DOMAIN DIALOG SYSTEM

BACKGROUND

Spoken language understanding (SLU) is a key component in human-computer conversational interaction systems. Existing spoken dialog systems operate in single-user scenarios, where a user speaks to the system and the system gives feedback in response to the user's request, such as checking flight status or finding a restaurant. However, no commercially available system is capable of active involvement in multi-user conversations.

Many existing spoken dialog systems are application-specific and capable of responding only to requests within limited domains. Each domain represents a single content area such as search, movie, music, restaurant, shopping, flights, etc. Limiting the number of domains generally allows spoken dialog systems to be more accurate, but requires the user to resort to different resources for different tasks.

While the utterances addressed to the computer are the main focus of multi-user spoken dialog systems, many problems initially defined on human-human conversation understanding are closely related to this task. For example, dialog act labeling defines the function of each dialog act and their relationship to provide increased understanding of user intent. Addressee detection attempts to differentiate between utterances addressed to another human or to the computer allowing users to speak to the computer naturally without any intervention, such as requiring the user to speak an addressing term (e.g., "computer") or make an addressing gesture (e.g., pushing a button or looking at a camera) in conjunction with making a request.

Previous work on domain detection studied this problem in a single-user scenario, where there is only one user speaking to the computer and in that dataset, the utterances were independently collected without context, i.e., the user speaks a random query or a series of related queries to the computer. Previous efforts in domain classification have shown that exploiting web query click logs using a semi-supervised method outperforms the fully supervised approach using limited annotated data on domain classification. While simple context (e.g., previous dialog act and speaker labels) has been exploited to help dialog act labeling and topic shift/continue detection has been used to help find relevant answers in a question answering system, context (mainly human-addressed context) has not been studied or used for domain detection and other language understanding tasks, such as user intent detection and slot filling.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for a multi-user, multi-domain dialog system including a conversation processing device in communication with a client device. The dialog system understands user requests when multiple users are interacting with each other as well as the dialog system. The dialog system uses multi-human conversational context to improve domain detection. Using interactions between multiple users allows the dialog system to better interpret machine directed conversational inputs in multi-user conversational systems.

The dialog system employs topic segmentation to chunk conversations for determining context boundaries. Using general topic segmentation techniques, as well as the specific domain detector trained with conversational inputs collected by a single user system, allows the dialog system to better determine the relevant context. Topic segmentation groups conversational inputs from a multi-user conversation into topic segments based on the similarity between topics. When the topic of the conversation changes, the topic segmentation component generates a topic boundary that separates the conversational inputs.

The conversational context of the computer-addressed conversational input and conversational inputs occurring prior to the current computer-addressed conversational input for use in domain detection and other language understanding functions. When searching for context in prior conversational inputs, the feature extraction operation stops at topic boundaries. The conversational context is based on lexical and contextual features extracted from a collection of a selected number of prior conversational inputs within the same topic segment. The use of conversational context helps reduce the domain detection error rate, especially in certain domains, and allows for better interactions with users when the machine addressed turns are not recognized or are ambiguous. The dialog system supports multiple domains allowing it to respond to most of the queries the users may have.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figure 1:
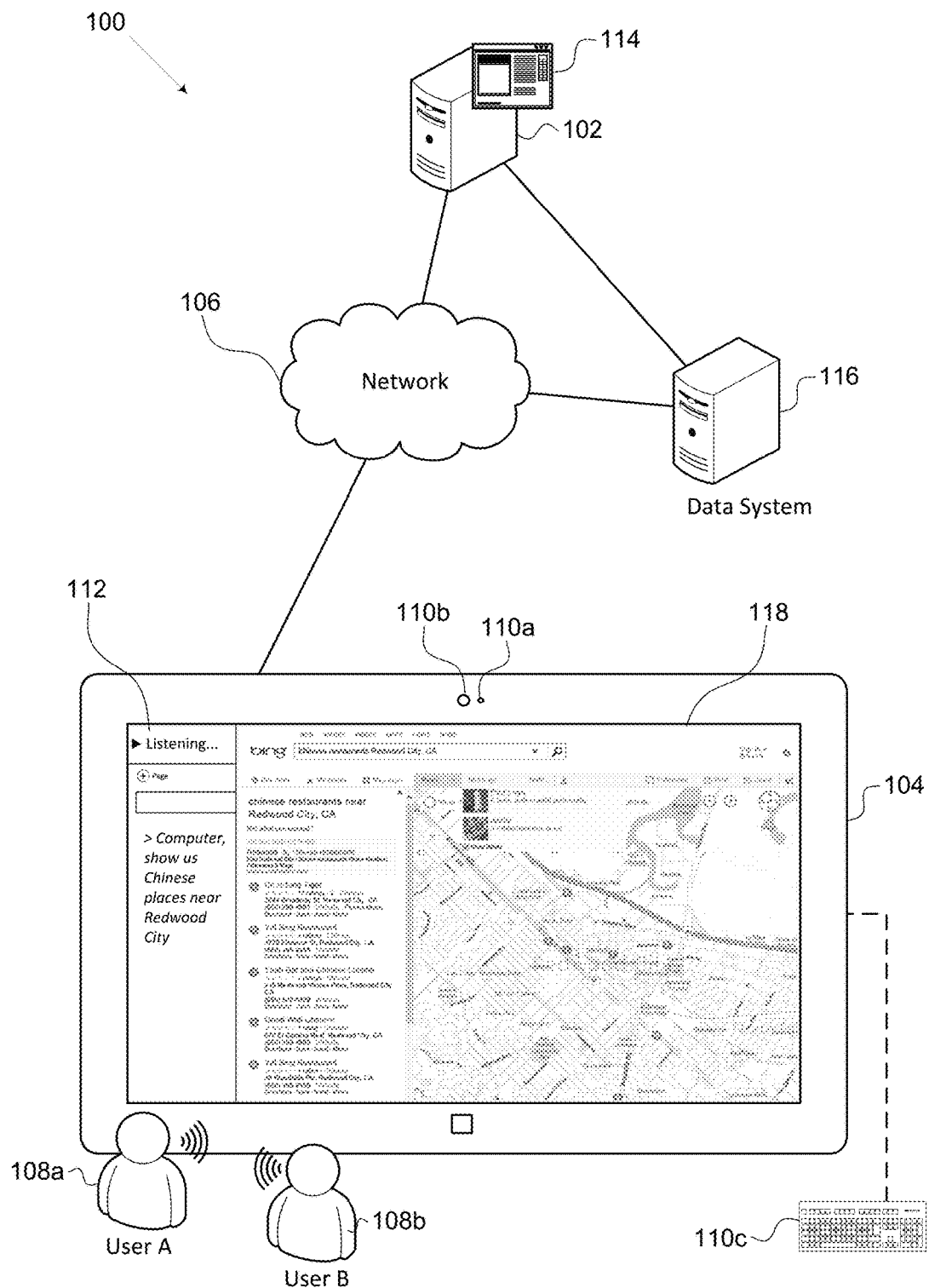
FIG. 1 illustrates one embodiment of a dialog system including a dialog context processing engine in a typical operating environment.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a dialog system for use in a multi-user, multi-domain environment are described herein and illustrated in the accompanying figures. The dialog system understands user requests when multiple users are interacting with each other as well as the dialog system. The dialog system uses multi-human conversational context to improve domain detection. Using interactions between multiple users allows the dialog system to better interpret machine directed conversational inputs in multi-user conversational systems. The dialog system employs topic segmentation to chunk conversations for determining context boundaries. Using general topic segmentation techniques, as well as the specific domain detector trained with conversational inputs collected by a single user system, allows the dialog system to better determine the relevant context. The use of conversational context helps reduce the domain detection error rate, especially in certain domains, and allows for better interactions with users when the machine addressed turns are not recognized or are ambiguous. The dialog system supports multiple domains allowing it to respond to most of the queries the users may have.

The present invention is applicable to a wide variety of dialog system modalities, both input and output, capable of responding to conversational inputs such as, but not limited to, speech, writing (e.g., text or handwriting), touch, gesture, and combinations thereof (e.g., multi-mode systems) addressed to the computer or another human in a multi-user conversation. For example, the dialog system may be responsive to an instant messaging conversation (i.e., text-based conversational inputs) or a voice conversation (i.e., speech-based conversational inputs) between users that includes conversational inputs that may be expressly or implicitly addressed to the dialog system. Embodiments generally described in the context of a modality-specific dialog system (e.g., a spoken dialog system) are merely illustrative of one suitable implementation and should not be construed as limiting the scope to any particular modality or modalities or a single modality and should be read broadly to encompass other modalities or inputs along with the corresponding hardware and/or software modifications to implement other modalities.

FIG. 1 illustrates one embodiment of a multi-user, multi-domain dialog system. The dialog system 100 includes a conversation processing device 102 in communication with a client device 104. In some embodiments, the conversation processing device and the client device are implemented as a single computing device. For purposes of the discussion, the client device and the conversation processing device are described as separate devices. In various embodiments, the client device, the conversation processing device, and the data systems are in communication via a network 106, such as a local area network, a wide area network, or the Internet.

The client device may be, but is not limited to, a general purpose computing device, such as a laptop or desktop computer, a tablet or surface computing device, a smart phone or other communication device, a smart appliance (e.g., a television, DVD player, or Blu-Ray player), or a video game system (e.g., Xbox 360® or Xbox One™). The client device includes one or more input devices that collect speech and, optionally, additional inputs from the users 108a, 108b. The users are the human participants in the conversation. The client device includes one or more input devices that receive turns from the conversation between the users and the dialog system as conversational inputs. In the illustrated embodiment, the input devices include an audio input device 110a (e.g., a microphone) that records the speech of the users, a video input device 110b (e.g., a camera) to record gestures by the users, and a tactile input device 110c (e.g., a touch screen, button, keyboard, or mouse) to receive manual inputs from the users. The various input devices may be separate components or integrated into a single unit (e.g., a Kinect® sensor).

In various embodiments, the client device runs a user agent 112 that interfaces with the dialog system. In some embodiments, the user agent is a general purpose application (e.g., a web browser) or operating system. In some embodiments, the user agent is a special purpose or dedicated application (e.g., a shopping client, movie database, or restaurant rating application).

The conversational inputs received by the input devices are passed to the dialog context processing engine 114 running on the conversation processing device that understands user requests allowing the dialog system to respond and/or participate in the conversation. In various embodiments, the dialog system is in communication with one or more data systems 116 or supported applications 118 that are referenced or invoked in order to handle user requests. The data systems provide content and information for the supported domains and may be internal (e.g., a back end system) or external (e.g., a third party knowledgebase) to the dialog system. Likewise, the supported applications acting on content for the supported domains and may be internal or external to the dialog system. A training engine may be used to build a statistical model or policy to train the dialog context processing engine.

Figure 2:
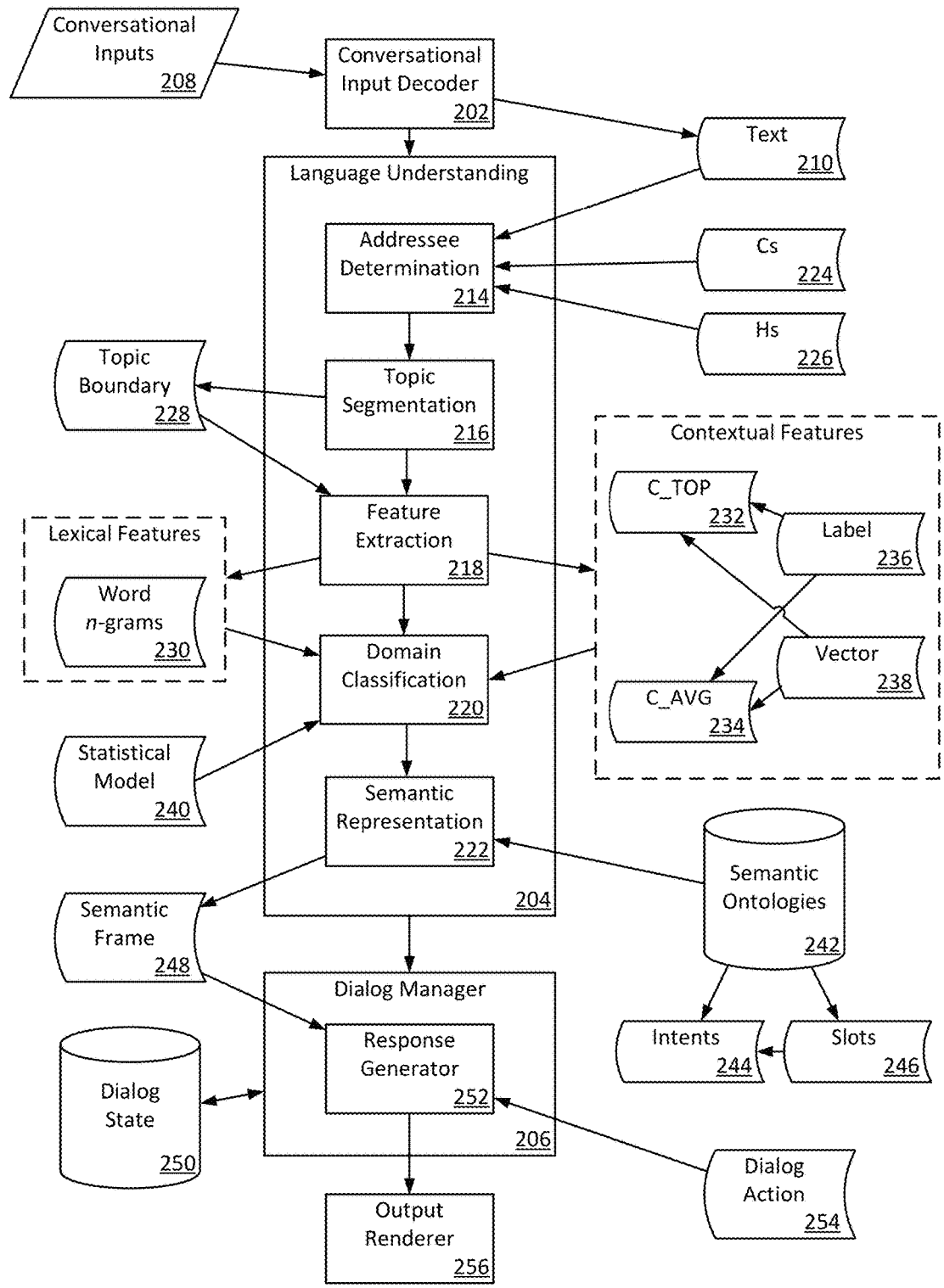
FIG. 2 is a block diagram of one embodiment of a dialog system including the dialog context processing engine.

FIG. 2 is block diagram of one embodiment of a dialog system including the dialog context processing engine. The dialog system includes a conversational input decoder (e.g., a speech recognizer) 202, a language understanding module 204, and a dialog manager 206. The conversational input decoder translates words from the conversational inputs 208 (i.e., the utterances) received by the conversational context processing engine into text 210.

The language understanding module disassembles and parses the text. The text is converted into semantic representations that may be understood and processed by a machine. In a multi-domain system, the process of interpreting a computer-addressed conversational input usually begins with domain detection. The problem of estimating the domain c' for a given computer addressed conversational input a is formally defined as $$c' = \operatorname{argmax}_{c \in C} p(c|u), \quad (1)$$

where C is the set of all domains. In the illustrated embodiment, the language understanding module includes an addressee determination component 214, a topic segmentation component 216, a feature extraction component 218, a domain classification component 220, and a semantic representation component 222. The addressee determination component determines whether a conversational input is a computer-addressed conversational input (Cs) 224 or a human-addressed conversational input (Hs) 226.

The topic segmentation component groups conversational inputs in the multi-user conversational context into topic segments based on the similarity between topics. A typical multi-user conversation covers multiple topics or themes. For example, users may talk about their future vacation, check the weather at the vacation destination, and check flights all within the same conversation. When the topic of the conversation changes, the topic segmentation component generates a topic boundary 228 that separates the conversational inputs. The topic boundary may be used by the other components of the language understanding module (e.g., the feature extraction component and the domain detection component) to only use conversational inputs within the same topic segment when understanding a conversational input.

The feature extraction component extracts lexical and contextual features from the computer-addressed conversational input and conversational inputs occurring prior to the current computer-addressed conversational input (i.e., prior conversational inputs) for use in domain detection. The lexical features extracted include, but are not limited to, word n-grams 230. A word n-gram is a contiguous sequence of n words from a given sequence of text or speech. In various embodiments, the dialog system extracts one or more of unigrams, bigrams, and trigrams from the current conversational input.

The contextual features extracted include, but are not limited to, the top context (C_TOP) 232 and the average context (C_AVG) 234 obtained from a collection of a selected number of prior conversational inputs within the same topic segment. The feature extraction component adds prior conversational inputs to the collection until the selected number is reached or a topic boundary is encountered. Some embodiments skip contextually insignificant conversational inputs when building the collection. Because the contexts assigned to conversational inputs containing nouns or noun phrases are typically the most informational, the feature extraction component considers conversational inputs including, but not limited to, dialog commands (e.g., "start over" or "go back") and interjections (e.g., "ohh," "hmm," "no," or "yes") to be contextually insignificant conversational inputs. In some embodiments, conversational inputs with low domain confidence scores are also considered contextually insignificant conversational inputs by the feature extraction component.

The top context C_TOP and the average context C_AVG include a label 236 and a feature vector 238 derived from the collection. For both the top context and the average context, the feature extraction component selects the label of majority vote by all context conversational inputs within the feature extraction window. The feature vector for the top context C_TOP is the topic distribution score of the conversational input with the majority label nearest to the current conversational input. The feature vector for the average context C_AVG is the average of the topic distribution scores for all context conversational inputs within the collection is $$T_f = \frac{\sum_{j \in [i-1, i-w]} T_j}{w}, \quad (2)$$

where $T_f$ is the feature vector, $T_j$ is the topic distribution of conversational input $u_p$ and w is the feature extraction window size.

The domain classification component determines the relevant context to use from multi-human interaction. In various embodiments, the domain classification component is trained using a statistical model or policy 240 (i.e., prior knowledge) with conversational inputs collected by a single user system. Human-addressed conversational inputs are assigned domain labels based on prior knowledge. For computer-addressed conversational inputs, the domain classification component uses the extracted features to select the domain of the computer-addressed conversational input. In various embodiments, the domain assigned to the current computer-addressed conversational input is the one determined from the lexical or contextual feature with the highest topic distribution score.

The semantic representation component converts the computer-addressed conversational input into a domain-specific semantic representation based on the domain assigned to the computer-addressed conversational input by the domain detection component. A semantic ontology 242 for each domain that includes domain-specific intents 244 and slots 246 is defined to describe possible user requests within the domain. The semantic representation component determines the action a user wants a computer to take or the information the user would like to obtain from the computer-addressed conversational input and generates the appropriate intent defined by the semantic ontology. Examples of intents include, but are not limited to, start over, go back, find information, find content, and play content. For example, the semantic ontology may define semantic frames 248 associated with an intent to search for information about movies using slots such as, but not limited to, director, actor, genre, release date, rating and about restaurants using slots such as, but not limited to, restaurant name, cuisine, restaurant location, address, phone number, and service type. The semantic frame typically involves a schema of slot/value pairs that are typically domain specific. By way of example, a semantic frame to find information in a domain may be defined as Find_Information(<domain>, <slot tag>, <slot value>) or Find_<domain>(<slot tag>, <slot value>).

The semantic representation component estimates the intent of the computer-addressed conversational input, selects a semantic frame associated with the intent, and maps the entities extracted from the computer-addressed conversational input to the corresponding slots to fill the semantic frame. For example, the computer-addressed conversational input "Show me movies by Roberto Benigni" may be mapped to the semantic frame as Find_Information(movie, director, Roberto Benigni).

The dialog manager preserves the dialog state 250 of the conversation. The dialog state is stored in a dialog state memory (e.g., a dialog state database). In general, the dialog state includes everything that happens during the conversation such as, but not limited to, the conversational input history. The dialog manager also maintains the flow of the conversation by responding to computer-addressed conversational inputs. When a computer-addressed conversational input occurs, a response generator 252 performs a dialog action 254 associated with the semantic representation of the conversational input and generates a response for presentation to the users. Examples of dialog actions include, but are not limited to, executing an informational query against a knowledgebase or other data system (e.g., get a list of recent movies of a selected genre staring a selected actor from a movie database), executing a transactional query to invoke a supported application (e.g., play a media file using a supported media player or submit a query to web search engine using a supported web browser), and executing a navigational query (e.g., start over or go back) against the dialog system to navigate through the dialog state. Examples of external data systems include, but are not limited to, online store fronts, online movie databases, online encyclopedias, and search engines. Using the semantic frame Find_Information(movie, director, Roberto Benigni) as an example, the dialog action may be an information query such as SELECT ?movie {?movie Director 'Roberto Benigni'}.

An output renderer 256 generates an output showing the response to the dialog action, which may be presented to the users via the user agent. In some embodiments, the output renderer includes an optional natural language generation component that converts the response into natural (i.e., human) sounding text for presentation to the users. In some embodiments, the output renderer includes an optional text-to-speech component that translates the natural language output into speech and allows the dialog system to verbally interact with the users.

Figure 3:
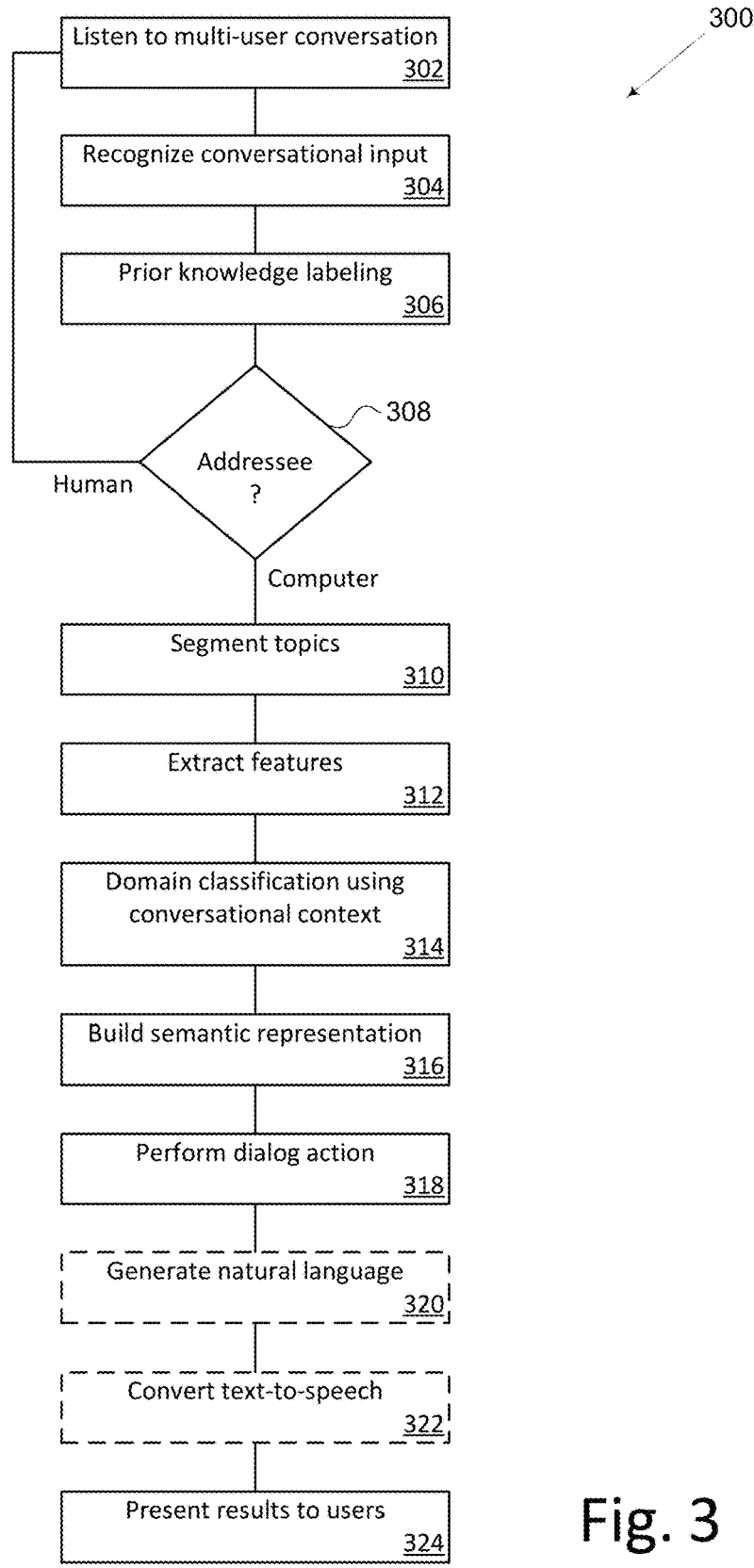
FIG. 3 is a high level flowchart of one embodiment of the conversational context-based understanding method.

FIG. 3 is a high level flowchart of one embodiment of the conversational context-based understanding method. The conversational context-based method 300 begins with a listening operation 302 in which the dialog system listens to the conversation between two or more users. During the listening operation, the dialog system records the conversational inputs of the users along with any additional information (i.e., gestures or direct inputs) associated with the conversational inputs. A speech recognition operation 304 transcribes conversational inputs (i.e., speech) to text. In various embodiments, the recordings of the conversational inputs are temporary (i.e., ephemeral) recordings that are discarded as the conversational inputs are recognized. Embodiments of the dialog system retain the transcribed text until the conversational context-based understanding method is complete.

A prior knowledge labeling operation 306 uses conversational input domain detection trained from computer-addressed conversational inputs to assign a domain category to the human-human parts of the conversation and, optionally, the computer-addressed conversational inputs. In some embodiments, a dialog corpus containing a set of single-user conversational inputs annotated with domains is used to improve context mining. The dialog corpus include domain-related conversational inputs as well as dialog commands and interjections (e.g., "oh yes"). The training engine is used to build a statistical domain classification model from the set of single-user conversational inputs. Examples of suitable training engines/algorithms include, but are not limited to, icsiboost, and Boostexter, and Adaboost.

For each conversational input $u_i$, the output of the prior knowledge operation is a vector of scores $<score_{i1}, score_{i2}, \ldots, score_{iT}>$, where T is the number of categories in the set of conversational inputs. The scores are calibrated to real values using the sigmoid function $$p_{ik} = \frac{1}{1 + \exp(-2 \times n \times score_{ik})}, \qquad (3)$$

where $p_{ik}$ indicates the probability of domain k for each conversational input $u_i$ in a multi-user conversation and n is the number of training iterations of the training engine (i.e., the number of weak learners). The vector of real values is then normalized to a probability distribution $<t_{i1}, t_{i2}, \ldots, t_{iT}>$ using the function $$t_{ik} = \frac{p_{ik}}{\sum_{j \in [1,M]} p_{ij}}, \qquad (4)$$

where $t_{ik}$ indicates the probability of domain k for each conversational input $u_i$ in a multi-user conversation, conversational inputs categorized as dialog commands or interjections do not contain any topic information and are skipped for purposes of determining context. When the domain confidence is lower than a threshold, conversational input $u_i$ is considered ambiguous and discarded. For each conversational input $u_i$, the domain confidence is calculated as $$\max_{k \in [1,M]} t_{ik}. \qquad (5)$$

The prior domain distribution is used as topic distribution in context and as classification features.

An addressee determination operation 308 determines whether a conversational input is addressed to the dialog system (i.e., a query directed to the computing device). In various embodiments, the addressee determination operation bases the addressee determination on an explicit addressing signal associated with the conversational input. Examples of explicit signals include, but are not limited to, verbal cues (e.g., "Computer, . . . "), gestures (e.g., looking at the camera while speaking, pointing, or waving), direct inputs (e.g., pressing a button contemporaneously with speaking the computer-addressed conversational input).

In various embodiments, the addressee determination operation bases the addressee determination on an implicit signal associated with the conversational input. An implicit signal may be, but is not limited to, using a turn without an explicit addressing signal (i.e., based on the user's silence, words, or prosody). For example, during a conversation, one user may say "Okay, let's find a place then," to which the other user responds "Are there any Italian restaurants nearby?" Based on the words alone or together with silence and/or prosody, this conversational input can be determined to be implicitly addressed to the computer.

In other embodiments, the dialog system may participate in the conversation without being implicitly or explicitly addressed when the addressee determination operation determines that the dialog system has information to add to the conversation. For example, during a conversation, one user may say "Wanna eat lunch?" to which the other user responds "Okay, do you wanna walk to downtown and find an Italian place?" After the first user responds affirmatively with "Okay," the computer may interject by stating "Here are some Italian restaurants in the downtown area" and/or showing downtown Italian restaurants on the display.

A topic segmentation operation 310 divides the conversation into segments with each segment covering a single topic. In various embodiments, the topic segmentation operation separates conversational inputs into topic segments based on domain detection scores. The conversational inputs are collected into blocks of conversational inputs falling within a topic block window. The size of the topic block window corresponds to the number of conversational inputs collected into each block. For example, a window size of three means that each topic block contains three conversational inputs. In various embodiments, dialog commands, interjections, and conversational inputs with low domain confidence scores are skipped when adding conversational inputs to the topic block. The domain distribution score of each topic block is the average of the domain distribution scores for the conversational inputs contained within the topic block. The cosine similarity of the average domain distribution scores between topic blocks is evaluated to determine whether the topic blocks belong to the same topic segment. If the cosine similarity is lower than a selected threshold value, the topic blocks are considered to belong to different topic segments and a topic boundary is created between the topic blocks. Other topic segmentation techniques such as, but not limited to, TextTiling and latent semantic analysis and other measures of similarity may also be used.

TABLE 1

Conversation fragment for feature extraction example

| ID | Prior Label | Utterance Transcription |
|---|---|---|
| $u_{i-5}$ | search | see we have this thing where we go to |
| ☒ | movie | I know it's annoying. |
| ☒ | command | start over. |
| $u_{i-4}$ | music | ohh. try turning it. ohh no. it's okay. |
| $u_{i-3}$ | movie | look for Avengers reviews on Rotten Tomatoes DOT com. |
| $u_{i-2}$ | navigation | go to Rotten Tomatoes DOT com. |
| $u_{i-1}$ | movie | you also can't get new movies. like anything. |
| ☒ | command | go back. |
| $u_i$ | music | Marvel's The Avengers. |

A feature extraction operation 312 extracts the conversational context of prior conversational inputs within the current topic segment for use in assigning a domain category to the current conversational input. When searching for context in previous conversational inputs, the feature extraction operation stops at topic boundaries. Table 1 shows a sample conversation fragment from a multi-user conversation. The prior label represents the label assigned to the conversational input by the dialog system in the prior knowledge operation. The conversational inputs appearing in a bold font are the computer-addressed conversational inputs subject to domain detection. For conversational input $u_i$, the feature extraction operation exploits the context of the previous conversational inputs that fall within the feature extraction window. In Table 1, the symbol ☒ in the ID column indicates conversational inputs that are skipped during the feature extraction operation (i.e., one conversational and two command conversational inputs).

Embodiments of the dialog system use lexical features extracted from the current conversational input $u_i$ in combination with context features extracted from one or more prior conversational inputs to select the domain for the computer-addressed conversational input. In some embodiments, the lexical feature used by the dialog system includes one or more word n-grams. In some embodiments, the context from previous conversational inputs is integrated into the context of the current conversational input using the top context C_TOP. Using the conversation fragment of Table 1 with a window size of five as an example of determining C_TOP, the selected label is "movie" and the feature vector is the topic distribution score for conversational input $u_{i-1}$, which is the closest conversational input to conversational input $u_i$ with label of "movie." In some embodiments, the context from previous conversational inputs is integrated into the context of the current conversational input using the context average C_AVG. Using the conversation fragment of Table 1 with a window size of five as an example of determining C_AVG, the selected label is still "movie," but the feature vector is the average topic distribution score for conversational inputs $u_{i-1}$ to $u_{i-5}$.

A domain classification 314 operation selects a domain for the current computer-addressed conversational input identified from the lexical and contextual features. In various embodiments, the domain assigned to the current computer-addressed conversational input is the one determined from the lexical or contextual feature with the highest topic distribution score.

With the domain of the conversational input classified, a semantic representation build operation 316 determines the intent and the associated entities to fill the slots of the intent. A response generation operation 318 performs the appropriate dialog action. For example, informational queries (e.g., "find the movies of a certain genre and director") may be executed against knowledge repositories, transactional queries (e.g., "play movie") may be executed against supported applications and/or media, and command queries ("go back to the previous results") may be executed against the dialog system to navigate through the dialog. An optional natural language generation operation 320 generates a text-based response in natural language. An optional text-to-speech operation 322 generates a computer voice that speaks to the users and allows the dialog system to join the conversation as an active participant. For example, the text-to-speech operation speaks the text of the natural language response in addition to or in lieu of displaying the text of the natural language response. Finally, an output operation 324 renders and displays the results of the dialog action to the users.

Figures 4, 5:
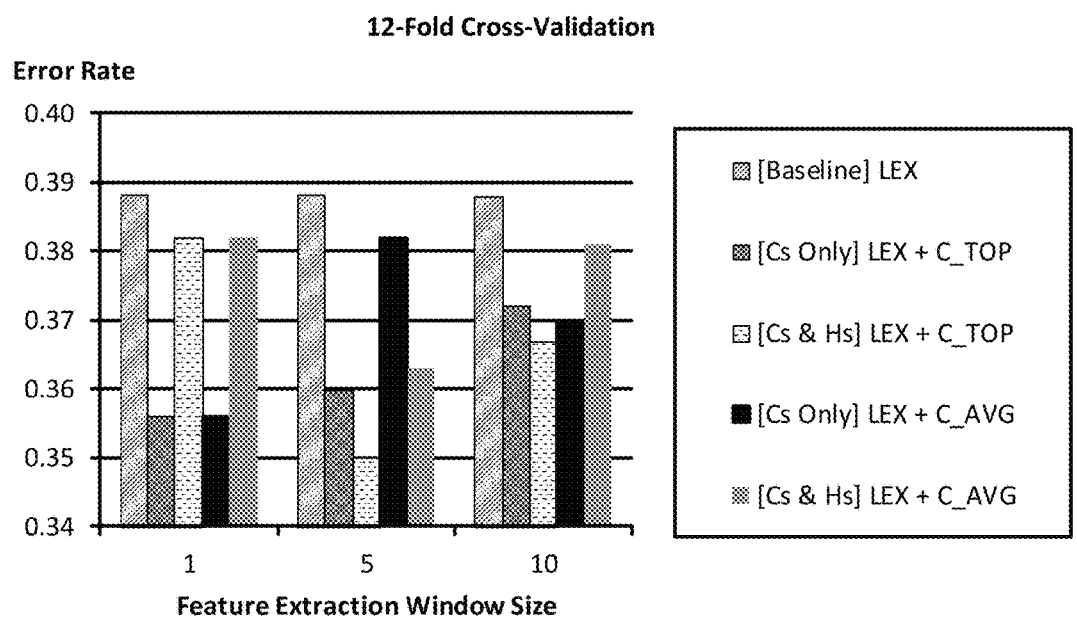
FIG. 4 illustrates an example of the selection of conversational context using topic boundaries for computer-addressed conversational inputs only Cs and both computer- and human-addressed conversational inputs Cs & Hs.
FIG. 5 is a series bar chart showing a 12-fold cross-validation of the dialog system for LEX+C_TOP and the LEX+C_AVG features against only computer-addressed conversational inputs Cs and both computer- and human-addressed conversational inputs Cs & Hs.

FIG. 4 illustrates an example of the selection of conversational context using topic boundaries for computer-addressed conversational inputs only Cs and both computer- and human-addressed conversational inputs Cs & Hs.

TABLE 2

System performance (error rate)

| Window | | Error Rate (%) | |
|---|---|---|---|
| Size | Feature (s) | Cs | Cs & Hs |
| N/A | LEX (baseline) | 38.8 | N/A |
| 1 | LEX + C_TOP | 35.6 | 38.2 |
| 5 | LEX + C_AVG | 38.2 | 36.3 |
| 5 | LEX + C_TOP | 36.0 | 35.0 |
| 10 | LEX + C_AVG | 37.0 | 38.1 |
| 10 | LEX + C_TOP | 37.2 | 36.7 |

Performance of the feature extraction operation may be evaluated relative to a baseline using only the lexical features for domain detection of a computer-addressed conversational input. The performance evaluation involved comparing C_AVG and C_TOP calculated with window sizes of 1, 5, and 10 applied to only computer-addressed conversational inputs (Cs) and both computer-addressed and human-addressed conversational inputs (Cs & Hs) with manual annotations. Table 2 shows the performance measured by error rate of the baseline and using different context feature C_AVG and C_TOP under varied window size. The use of context features with both computer- and human-addressed conversational inputs and a window size of five reduced the domain detection error rate to 35.0% from the baseline domain detection error rate of 38.8% using only lexical features without requiring the use of correct detection of computer-addressed conversational inputs for selecting context.

The results show that context feature C_TOP is consistently better than C_AVG in different window size and different context types, except when using only computer-addressed conversational inputs with a window size of 10. There are at least two factors that contribute to creating this exception. One factor is illustrated by the conversation fragment of Table 3 showing the natural tendency of users discuss sub-topics while remaining in the same theme (e.g., finding a restaurant). Here, the users talk about weather, then transportation, then the restaurant. A topic boundary may (as in this example) or may not exist depending upon whether the first part of the conversation includes "restaurant"-themed conversational inputs.

TABLE 3

Example of topic shifts in context

| ID | Prior Label | Speaker | Utterance Transcription |
|---|---|---|---|
| $u_{i-12}$ | weather | A | how is the weather tonight? |
| $u_{i-11}$ | movie | B | ohh looks nice. |
| $u_{i-10}$ | music | A | aww it's a bit cold. |
| $u_{i-9}$ | transportation | B | you wanna walk to castro? |
| $u_{i-8}$ | calendar | A | okay good idea well let me call Adam |
| | | | topic boundary |
| $u_{i-7}$ | restaurant | A | well okay before we go outdoor before let's decide on what we are gonna eat. |
| $u_{i-6}$ | restaurant | A | what do you wanna eat? |
| $u_{i-5}$ | restaurant | B | let's check. |
| $u_{i-4}$ | events | A | you wanna go to this new place on at the corner of california and castro? |
| $u_{i-3}$ | music | A | you remember the name? |
| $u_{i-2}$ | restaurant | B | let's check places with outdoor dining first |
| $u_{i-1}$ | conversational | A | okay let's do that |
| $u_i$ | restaurant | B | find restaurants with outdoor dining along the castro |

A second factor is the inaccuracy of the prior labels assigned to the conversational inputs by the prior knowledge operation, such as the conversational inputs labeled as "movie" and "music" in this example. Mislabeling occurs when domain instances have a large vocabulary in the single-user training dataset used by the prior knowledge operation compounded by the fact that the dataset does not include any examples of multi-user interactions.

Without the multi-user context (i.e., the human-human portions of the conversation), performance drops as the window size increases from one to five. Based on this, if a single previous conversational input is used for context, better reliability is obtained by only looking at the computer-addressed conversational inputs; however, when using larger number of conversational inputs to select context, it is better to consider both the computer-addressed conversational inputs and the human-addressed conversational inputs.

In multi-user conversations, the additional context of the human-human portion of the conversation helps minimize the impact of off-topic (or sub-topic) conversational inputs on domain detection because of the tendency for a significant number of the most recent conversational inputs to be topic-related to the computer-addressed conversational input. Although still an improvement over the baseline, no performance improvement occurs in either scenario (Cs only or Cs & Hs) as the window size increases from five to 10. This suggests that conversations tend to gain contextual focus before a computer-addressed conversational input occurs and only limited context is needed to get better performance.

FIG. 5 is a series bar chart showing a 12-fold cross-validation of the dialog system for LEX+C_TOP and the LEX+C_AVG features against only computer-addressed conversational inputs Cs and both computer- and human-addressed conversational inputs Cs & Hs. As seen in the chart, the both the top context and the average context features outperform the baseline using only the lexical features. Further, the top context features generally outperform the average context features when using both computer- and human-addressed conversational inputs Cs & Hs.

Figure 6:
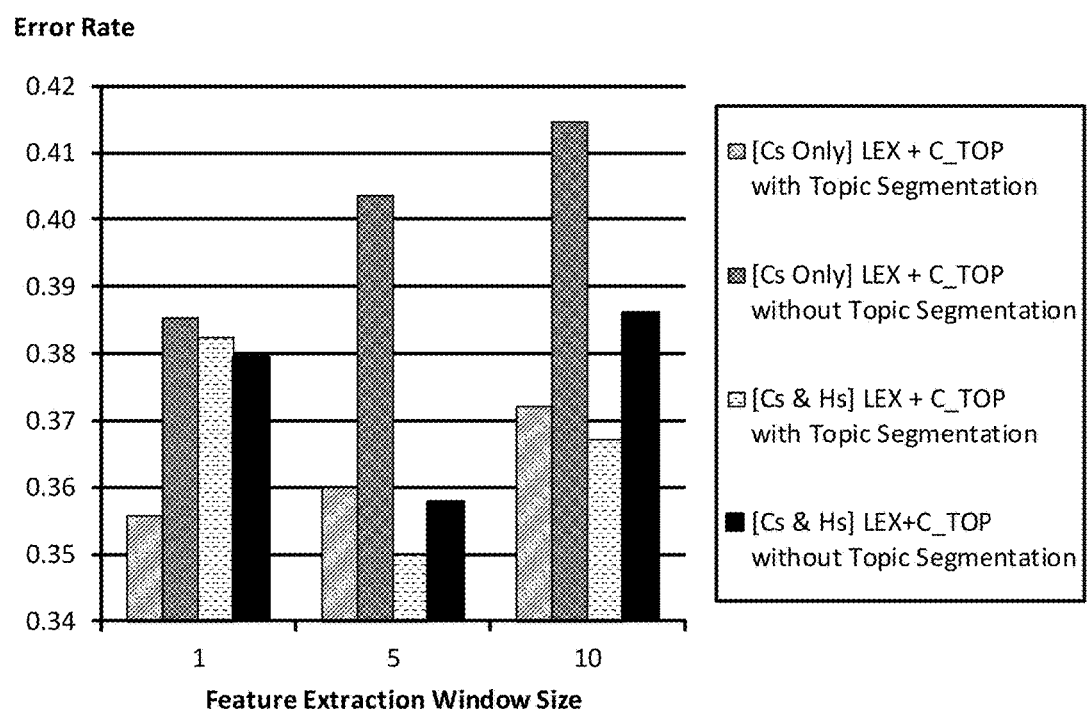
FIG. 6 is a series bar chart comparing the performance of the dialog system with and without topic segmentation based on the higher performing LEX+C_TOP features.

FIG. 6 is a series bar chart comparing the performance of the dialog system with and without topic segmentation based on the higher performing LEX+C_TOP features. As seen in the chart, the use of topic segmentation results in improved performance by avoiding noisy context during context selection in most cases. The exception being the combined computer- and human-addressed conversational inputs scenario with a window size of one.

The embodiments described herein primarily focus on the use of conversational context for improving domain detection accuracy; however, conversational context may also be utilized to improve accuracy of other language understanding function such as, but not limited to, intent detection, slot filling, and semantic pairing.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
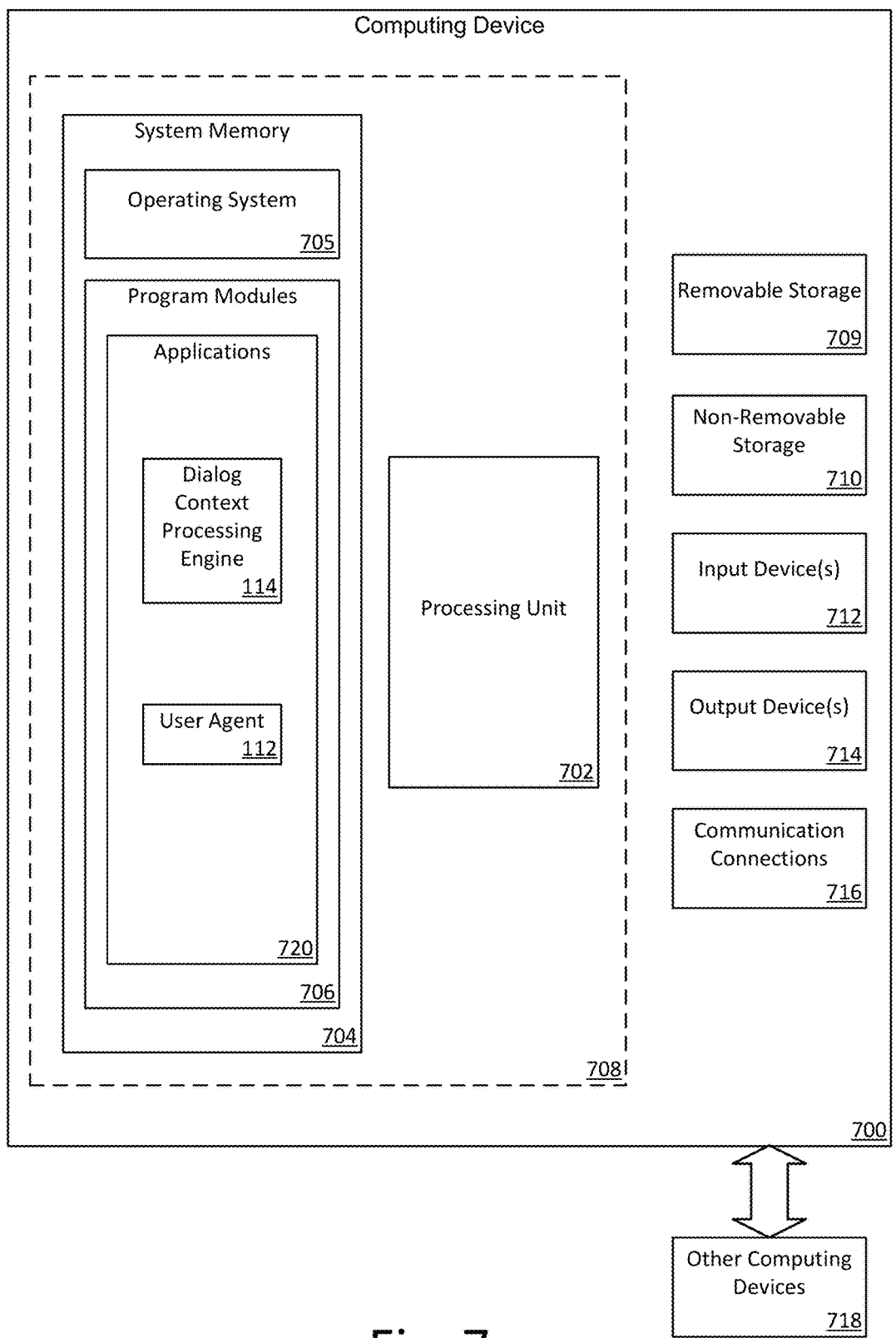
FIG. 7 is a block diagram illustrating one embodiment of the physical components of a computing device with which embodiments of the invention may be practiced.

FIGS. 7 and 8 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 7 is a block diagram illustrating physical components (i.e., hardware) of a computing device 700 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the user agent 112 and the dialog context processing engine 114. For example, the operating system 705 may be suitable for controlling the operation of the computing device 700. Furthermore, embodiments of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the language understanding method 300. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage.) Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

Figure 8A:
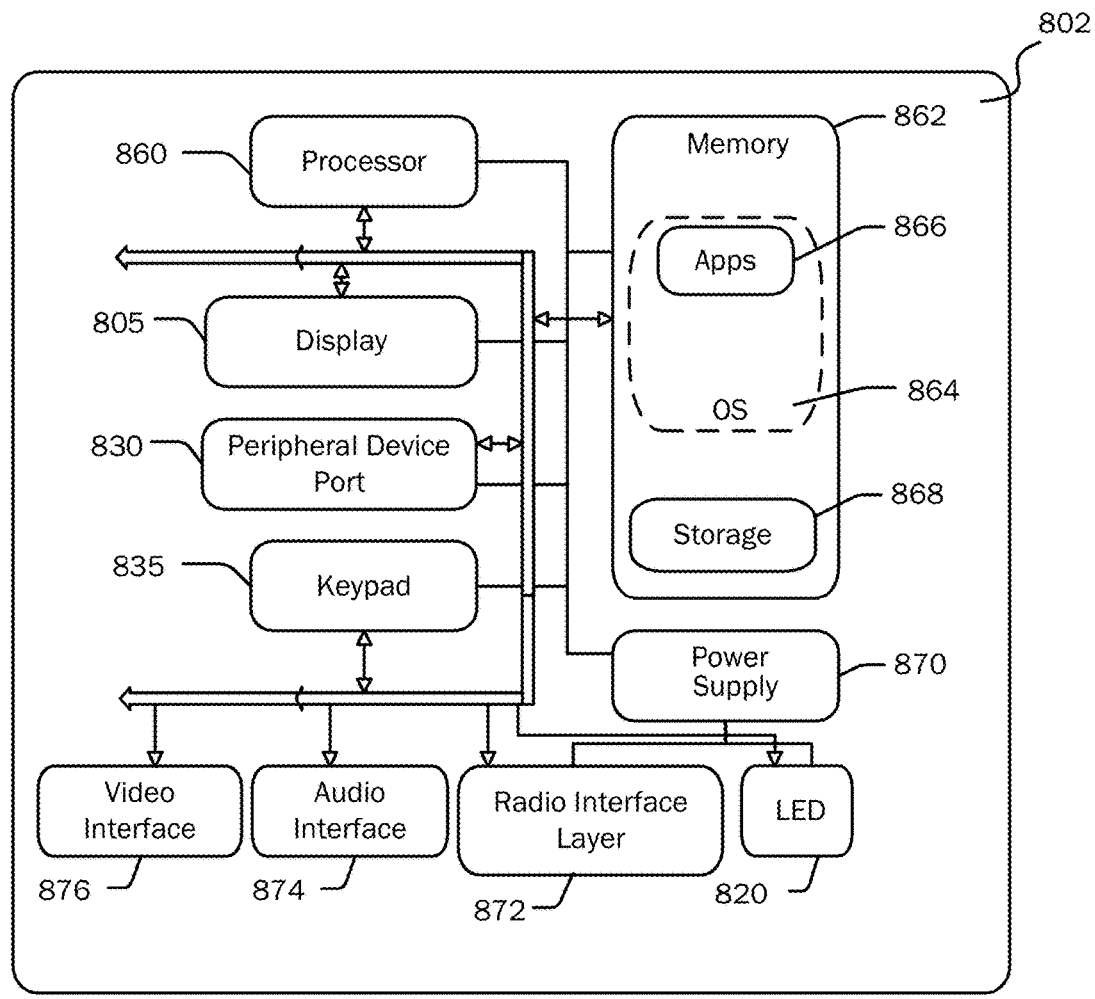
FIGS. 8A and 8B are simplified block diagrams of a mobile computing device with which embodiments of the present invention may be practiced.
Figure 8B:
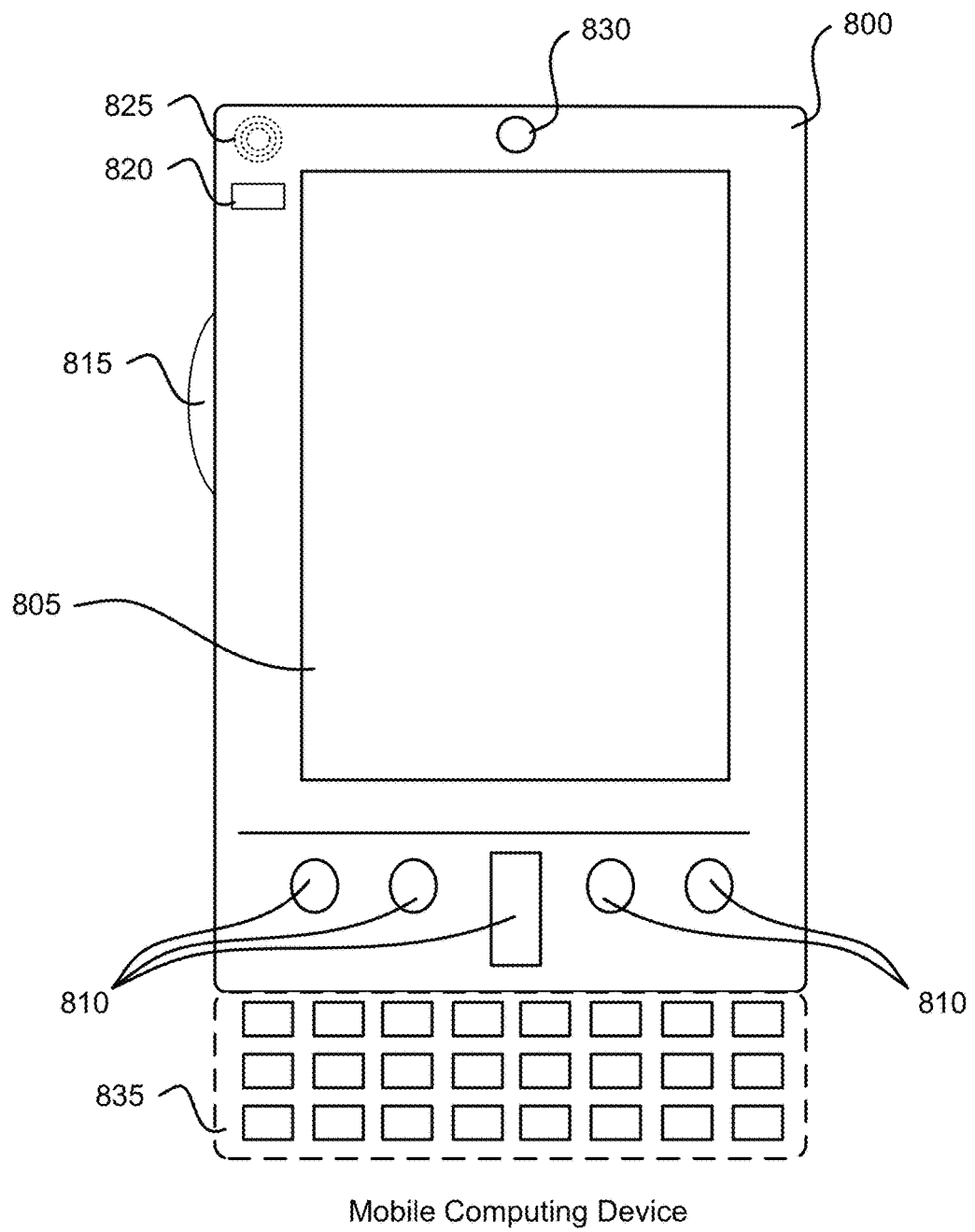

FIGS. 8A and 8B illustrate a mobile computing device 800 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface, a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a smart phone capable of running one or more applications (e.g., browsers, e-mail clients, notes, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
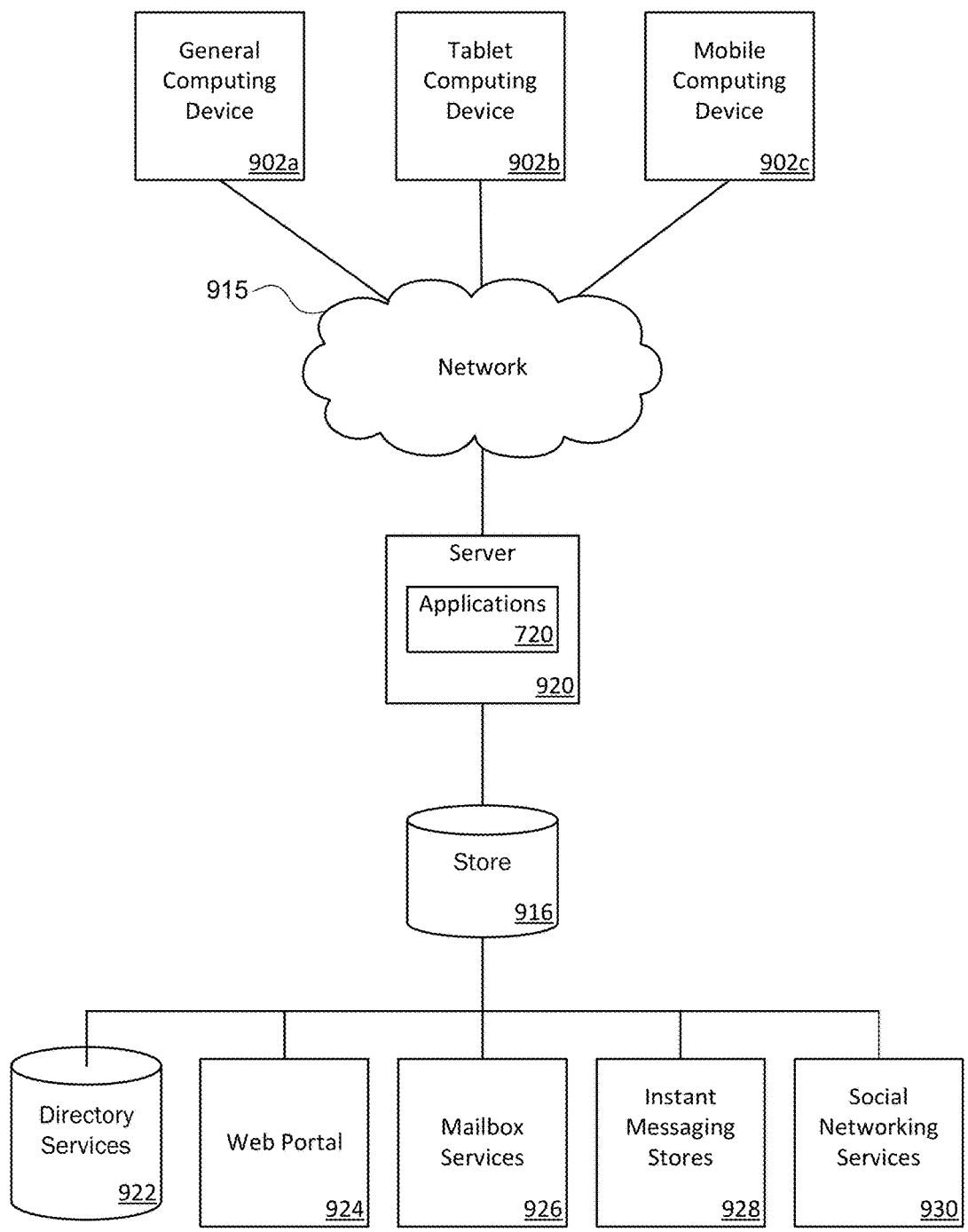
FIG. 9 is a simplified block diagram of a distributed computing system in which embodiments of the present invention may be practiced.

FIG. 9 is a simplified block diagram of a distributed computing system in which embodiments of the present invention may be practiced. Content developed, interacted with, or edited in association with the software applications 720 may be stored in different communication channels or other storage types. For example, various documents may be stored using a directory service 922, a web portal 924, a mailbox service 926, an instant messaging store 928, or a social networking site 930. The software applications 720 may use any of these types of systems or the like for enabling data utilization, as described herein. A server 920 may provide the software applications 720 to clients. As one example, the server 920 may be a web server providing the software applications 720 over the web. The server 920 may provide the software applications 720 over the web to clients through a network 915. By way of example, the client computing device may be implemented as the computing device 700 and embodied in a personal computer 902a, a tablet computer 902b, and/or a mobile computing device (e.g., a smart phone) 902c. Any of these embodiments of the client device 104 may obtain content from the store 916.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method for improving understanding of a computer-addressed conversational input in a multi-user conversation by a human-computer interaction system, the method comprising:

receiving input from on an electronic device from the multi-user conversation;

translating the input into conversational inputs using an input decoder, the conversational inputs including the computer-addressed conversational input and conversational inputs occurring prior to the computer-addressed conversational input, the computer-addressed conversational input instructing a computer to perform an action;

parsing, using natural language processing, conversational inputs into topic segments;

extracting, using an engine trained based on a statistical model, a conversational context of the conversational inputs within at least one of the topic segments, wherein the conversational context for the computer-addressed conversational input is extracted based on at least contextual features obtained from the conversational inputs occurring prior to the computer-addressed conversational input, wherein the conversational inputs occurring prior to the computer-addressed conversational input include at least one other computer-addressed conversational input and at least one human-addressed conversational input, and the contextual features include (a) a domain of a majority of the conversational inputs occurring prior to the computer-addressed conversational input and (b) a distribution score associated with at least one of the conversational inputs occurring prior to the computer-addressed conversational input.

2. The method of claim 1, further comprising detecting at least one of a slot or an intent of the computer-addressed conversational input.

3. The method of claim 1 wherein the extracting determines a domain of the computer-addressed conversational input.

4. The method of claim 1 wherein the parsing comprises:
collecting the conversational inputs into blocks using a selected window size;
determining a domain distribution score for each block;
evaluating similarity between the blocks using the domain distribution scores;
creating a topic boundary between two blocks when the similarity between the two blocks falls outside of a threshold.

5. The method of claim 4 further comprising calculating an average of domain distribution scores of the conversational inputs contained within each block.

6. The method of claim 4 further comprising:
calculating similarity of the domain distribution scores of two blocks;
comparing the similarity to the threshold.

7. The method of claim 1 further comprising:
collecting a selected number of conversational inputs into a feature extraction group;
selecting a label associated with the conversational inputs in the feature extraction group; and
establishing a feature vector from at least one topic distribution score.

8. The method of claim 7 further comprising selecting the topic distribution score of a prior conversational input within the feature extraction group that is closest in proximity to the computer-addressed conversational input and has a same label as the selected label.

9. The method of claim 7 wherein establishing a feature vector comprises calculating an average topic distribution score for a prior conversational input in the feature extraction group.

10. The method of claim 7 further comprising skipping dialog commands, interjections, and conversational inputs with low domain confidence scores.

11. The method of claim 7 further comprising skipping prior conversational inputs that do not contain nouns or noun phrases.

12. The method of claim 7 further comprising selecting a domain of the computer-addressed conversational input based on the selected label, the feature vector, and a contiguous sequence of n words from the computer-addressed conversational input.

13. A computer readable article of manufacture device containing computer executable instructions which, when executed by a computer, cause the computer to perform a method for detecting a domain of a computer-addressed conversational input in a human-computer interaction system, the method comprising:

receiving input on an electronic device from the multi-user conversation;

translating the input into conversational inputs using an input decoder, the conversational inputs including the computer-addressed conversational input and conversational inputs occurring prior to the computer-addressed conversational input, the computer-addressed conversational input instructing a computer to perform an action;

parsing, using natural language processing, conversational inputs into topic segments;

extracting, using an engine trained based on a statistical model, a conversational context of the conversational inputs within at least one of the topic segments, wherein the conversational context for the computer-addressed conversational input is extracted based on at least contextual features obtained from the conversational inputs occurring prior to the computer-addressed conversational input, wherein the conversational inputs occurring prior to the computer-addressed conversational input include at least one other computer-addressed conversational input and at least one human-addressed conversational input, and the contextual features include (a) a domain of a majority of the conversational inputs occurring prior to the computer-addressed conversational input and (b) a distribution score associated with at least one of the conversational inputs occurring prior to the computer-addressed conversational input.

14. The computer readable device of claim 13, further comprising detecting at least one of a slot or an intent of the computer-addressed conversational input.

15. The computer readable device of claim 13, wherein the extracting determines a domain of the computer-addressed conversational input.

16. The computer readable device of claim 13, wherein the parsing includes:
- collecting the conversational inputs into blocks using a selected window size;
- determining a domain distribution score for each block;
- evaluating similarity between the blocks using the domain distribution scores;
- creating a topic boundary between two blocks when the similarity between the two blocks falls outside of a threshold.

17. A computer system comprising a processor electrically connected to computer readable storage media, the computer-readable storage media storing instructions that, when executed, perform a computer-implemented method for detecting a domain of a computer-addressed conversational input in a human-computer interaction system, the method comprising:
- receiving input on an electronic device from the multi-user conversation;
- translating the input into conversational inputs using an input decoder, the conversational inputs including the computer-addressed conversational input and conversational inputs occurring prior to the computer-addressed conversational input, the computer-addressed conversational input instructing a computer to perform an action;
- parsing, using natural language processing, conversational inputs into topic segments;
- extracting, using an engine trained based on a statistical model, a conversational context of the conversational inputs within at least one of the topic segments, wherein the conversational context for the computer-addressed conversational input is extracted based on at least contextual features obtained from the conversational inputs occurring prior to the computer-addressed conversational input,
- wherein the conversational inputs occurring prior to the computer-addressed conversational input include at least one other computer-addressed conversational input and at least one human-addressed conversational input, and the contextual features include (a) a domain of a majority of the conversational inputs occurring prior to the computer-addressed conversational input and (b) a distribution score associated with at least one of the conversational inputs occurring prior to the computer-addressed conversational input.

18. The system of claim 17, further comprising detecting at least one of a slot or an intent of the computer-addressed conversational input.

19. The system of claim 17, further comprising:
- collecting a selected number of conversational inputs into a feature extraction group;
- selecting a label associated with the conversational inputs in the feature extraction group; and
- establishing a feature vector from at least one topic distribution.

20. The system of claim 19, further comprising selecting a topic distribution score of a prior conversational input within the feature extraction group that is closest in proximity to the computer-addressed conversational input and has a same label as the selected label.

* * * * *